TELEVISION TYPE FACSIMILE TRANSMISSION SYSTEM

Filed Dec. 11, 1948 3 Sheets-Sheet 1

Inventor
JOHN HAYS HAMMOND, JR.
By
Attorney

TELEVISION TYPE FACSIMILE TRANSMISSION SYSTEM

Filed Dec. 11, 1948 3 Sheets-Sheet 2

Inventor
JOHN HAYS HAMMOND, JR.
By [signature]
Attorney

TELEVISION TYPE FACSIMILE TRANSMISSION SYSTEM

Filed Dec. 11, 1948 3 Sheets-Sheet 3

INVENTOR
JOHN HAYS HAMMOND, JR.

BY Otis A. Mitchell
ATTORNEY

Patented June 16, 1953

2,642,492

UNITED STATES PATENT OFFICE 2,642,492

TELEVISION TYPE FACSIMILE TRANSMISSION SYSTEM

John Hays Hammond, Jr., Gloucester, Mass.

Application December 11, 1948, Serial No. 64,808

5 Claims. (Cl. 178—6.7)

This invention relates to television and more specifically to a system for transmitting news on any desired schedule.

The invention comprises means in connection with a standard television system for scanning and transmitting a news sheet and transmitting a characteristic control signal which operates means at the receiver causing a set of mirrors to be moved into position between the kinescope and a camera and to photograph the news sheet when it appears on the kinescope subsequent to which the film is processed and is placed in position to be torn off and used as a news sheet.

The invention also consists in certain new and original features of construction and combinations of parts hereinafter set forth and claimed.

Figure 1:
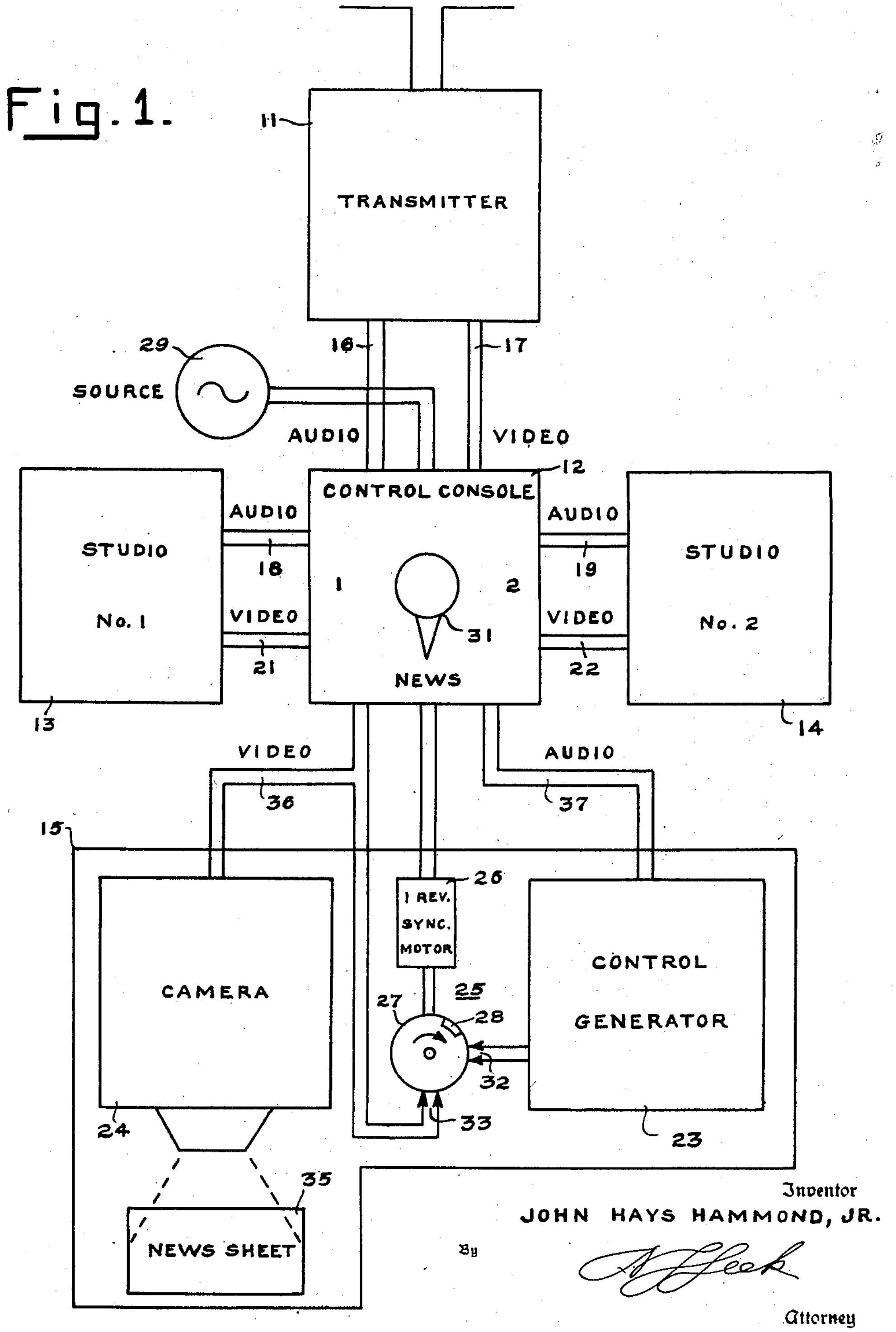
Figure 2:
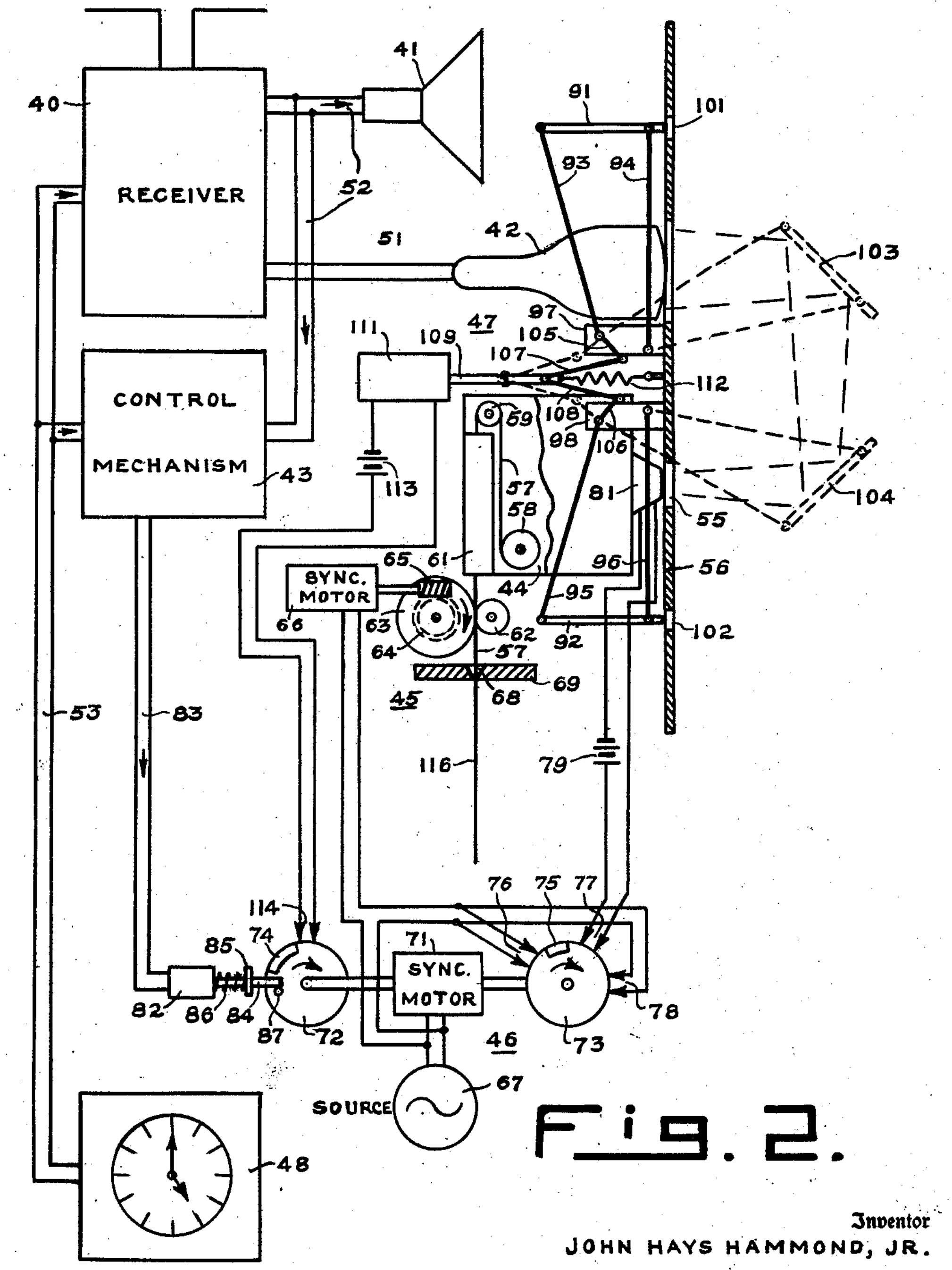
Figure 3:
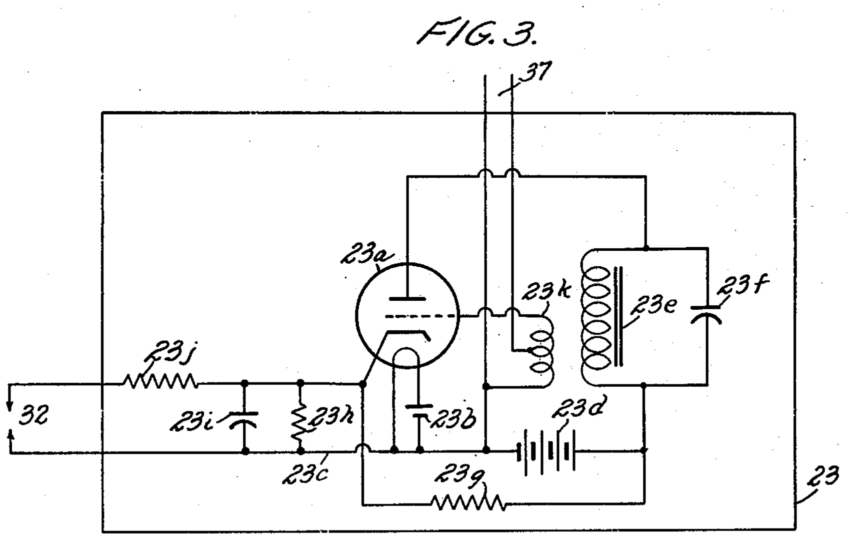
Figure 3:
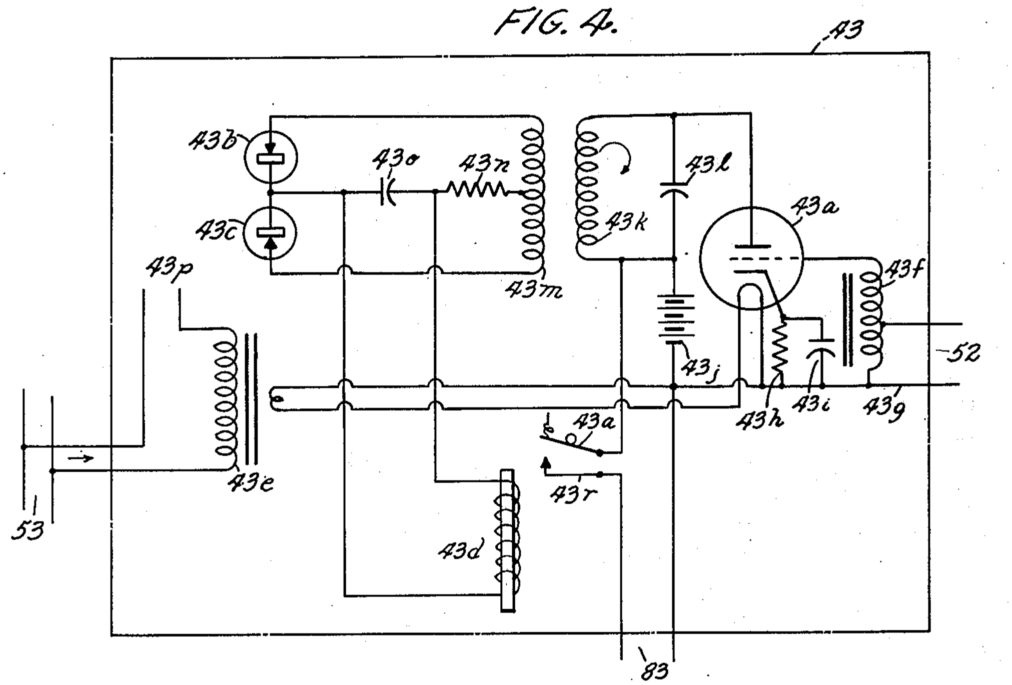

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a diagrammatic view of a television transmitting system constructed in accordance with the invention, Fig. 2 is a diagrammatic view of a television receiving system used in connection with the transmitting system shown in Fig. 1, Fig. 3 is a diagrammatic showing of a control generator suitable for use with the invention, and Fig. 4 is a diagrammatic showing of a control mechanism suitable for use in practicing the invention.

In the following description parts will be identified by specific names for convenience, but they are intended to be generic in their application to similar parts.

Referring to the drawings and more particularly to Fig. 1, the transmitting system consists of a standard television transmitter 11, a control console 12, two studios 13 and 14 and a news room 15. The control console is connected to the transmitter 11 by an audio channel 16 and a video channel 17, to the two studios 13 and 14 by two audio channels 18 and 19 and two video channels 21 and 22 respectively.

The news room 15 comprises a control generator 23, a television camera 24 and a timing mechanism 25.

Control generator 23 is a simple electronic audio oscillator with single frequency, which is so connected that the oscillation can be switched on by external shorting of the contacts 32, as by commutator 28 of the application. This reduces the positive voltage on the cathode to permit current to flow and the tube to oscillate. Signal is delivered to line 37. The tuned plate inductive feedback oscillator with cathode keying selected for illustrative purposes is disclosed in Fig. 7 of the U. S. patent to Chaffee No. 1,610,425. A similar keying system is disclosed on page 225 of the 1944 edition of "The Radio Amateurs' Handbook" of the American Radio Relay League.

A distinctive signal is to be delivered to line 37 during the external closure of contacts 32. For this purpose there is provided an audio oscillator triode **23*a*, the filament of which is heated by a battery 23*b* connected to one end of the filament, the other end of which is connected to ground line 23*c* and the negative of the battery. The plate circuit is powerized by the battery 23*d*, the negative end of which is connected to ground line 23*c*, and the positive end of which is connected through inductor 23*e* paralleled by capacitor 23*f* to the plate anode of triode 23*a*. The positive end of battery 23*d* is also connected through resistor 23*g* to the cathode of the triode 23*a*, which in turn is connected through resistor 23*h* paralleled by capacitor 23*i* to ground line 23*c*. The cathode is also connected through resistor 23*j* to one side of the contacts 32, the other side of which is connected to ground line 23*c*. The grid of 23*a* is connected through inductor 23*k* to ground line 23*c*, with the inductor suitably coupled to inductor 23*e*. One side of output line 37 is connected to ground line 23*c* and the other to a suitable tap on the inductor 23*k***.

Circuit constants are such that normally the cathode of the triode is positively biased sufficiently by the current flowing through resistors **23*g* and 23*h* so that no current flows through the triode tube, and no oscillations can occur. When, however, the connection is made externally across the contacts 32 by operation of the commutator segment 28, resistor 23*j* is placed in parallel with resistor 23*h*. This lowers the positive bias on the cathode so that oscillations start in the plate circuit elements 23*e*, 23*f*, and are sustained by the feedback to the grid by coil 23*k*. The frequency of these oscillations may be in the high audio range, such as 10000 cycles. Energy of this frequency is delivered over line 27, thence, through the switching circuit 12 to the transmitter. When the external connection is broken at contacts 32, the cathode bias increases to cut off the oscillations. The elements 23*g* and 23*h*** may be omitted, but the operation of the system is more positive if they are included.

The timing mechanism 25 consists of a self-starting synchronous motor 26 on the shaft of which is mounted a commutator 27 which is made of insulating material and is provided with a contact segment 28. The synchronous motor 26 and other similarly described motors may have speed reducing gears built into the motors so that the shaft rotates at a suitably low speed. A 60 cycle or other suitable A. C. generator 29 is provided which is connected through the control console 12 to the motor 26 in such a way that when the control console indicator 31 is turned to "News" the motor 26 will cause the commutator 27 to make one complete revolution in a clockwise direction and come to rest in its initial position. Engaging the commutator 27 are two sets of contacts 32 and 33, the former being connected to the control generator 23 and the latter being connected in the video output circuit 36 of the camera 24 which is connected to the control console. A news sheet 35 is shown as placed in position to be viewed by the camera 24. The control generator 23 is connected to the control console 12 by an audio channel 37.

Referring to Fig. 2 the receiving system comprises a television receiver 40, a loud speaker 41 and a kinescope 42. For recording and printing the news flashes a control mechanism 43 is provided together with a camera 44, a feeding mechanism 45, a timing mechanism 46, a mirror system 47 and a time clock 48.

Control mechanism 43 is a simple circuit in which the clock controlled line 53 turns on the filament of a selective amplifier tube. This drives a rectifier and a relay in an obvious manner to put D. C. power on line 83 to operate solenoid 86. The control mechanism 43 includes, illustratively, an electron tube with an untuned plate circuit, which drives a rectifier circuit to operate a relay and thereby powerize line 83. A similar circuit is shown, for example, in Fig. 1 of U. S. Patent No. 1,522,883. The use of diode or crystal rectifiers driven from the output of an amplifier is shown in Fig. 1 of U. S. Patent 1,998,617 where elements 31 and 32 correspond to elements **43*b* and 43*c* of Fig. 4; and where the system 33, 34, 35, 36 and 37 is an electromagnetic system driven from the rectifier output corresponding to 43*d*** of Fig. 4.

Control mechanism 43 is constructed to develop a D. C. voltage across line 83 for actuating solenoid 82, in response to a signal of suitable strength and suitable characteristics impressed upon line 52. Preliminary to functioning, the system is rendered operative by external shorting of the clock controlled line 53. The circuit includes a selective amplifier triode **43*a*, a pair of rectifiers 43*b*, 43*c*, a relay 43*d* and a filament transformer 43*e*. The grid of amplifier 43*a* is connected to ground line 43*g* through autotransformer 43*f*, a tap on which is connected to one side of line 52, the other side of which is connected to ground line 43*g*. The cathode is connected to ground line 43*g* by resistor 43*h* paralleled by capacitor 43*i*. Plate power is provided by battery 43*j*, the negative end of which is connected to ground and the positive end of which is connected through inductor 43*k* paralleled by capacitor 43L to the plate anode of triode 43*a*. This circuit 43*k*, 43L is tuned to the operating frequency corresponding to that supplied by block 23 above described. Coupled to inductor 43*k* is a secondary inductor 43*m*, the ends of which are connected to the anodes of rectifiers 43*b* and 43*c*. The cathodes are connected through the winding of relay 43*d*** and a resistor

**43*n* to a center tap on inductor 43*m*. The relay winding is shunted by capacitor 43*o*. The filament transformer is connected to a power source 43*p* when the circuit 53 is closed, and this then supplies current to the filament of triode 43*a* to render it operative. The moving blade 43*q* of relay 43*d* is connected to the positive end of battery 43*j*, the negative grounded end of which is connected to one side of output line 83. The fixed contact 43*r* of the relay is connected to the other end of line 83**.

In operation, after the time clock has connected the filament transformer **43*e* to the power source, the system becomes responsive to a control signal of suitable frequency and strength impressed from line 52, such as the 10,000 cycle signal transmitted over the audio channel from block 23. This signal is amplified by tube 43*a*, and by resonance in the plate circuit energizes the rectifiers in push-pull manner to produce direct current through the winding of relay 43*d*. Upon closure, the battery 43*j* is connected across the output line to operate solenoid 82**. It will be understood that normal audio sound signals will not have sufficient components in the vicinity of 10,000 cycles to cause actuation of the relay. It will be further understood that the circuit can be improved, if necessary, by use of further audio and D. C. amplifiers, and by use of circuits which are more sharply responsive to the desired signal.

The receiver 40 is connected to the kinescope 42 by a video channel 51 and to the loud speaker 41 and control mechanism 43 by an audio channel 52. The time clock 48 is connected by a circuit 53 to both the receiver 40 and the control mechanism 43.

The camera 44 is mounted behind an opening 55 in a panel 56 which forms part of the casing of the receiving system. The camera 44 is provided with a film 57 which is initially wound on a spool 58 and then passes over a roller 59 and through a processing chamber 61. After emerging from the processing chamber 61 the film 57 passes between two rollers 62 and 63 in the feeding mechanism 45 and through a V-shaped slot 68 in a member 69. Mounted on the shaft of the roller 63 is a worm wheel 64 which meshes with a worm gear 65 mounted on the shaft of a synchronous motor 66, which at suitable times is supplied with current from an A. C. source 67.

The timing mechanism 46 comprises a synchronous motor 71 on the shaft of which are mounted two commutators 72 and 73. The commutators 72 and 73 are made of insulating material and are provided with contact segments 74 and 75 respectively. The motor 71 is connected to the source of A. C. 67. Engaging the commutator 73 are three sets of contacts 76, 77 and 78. The contacts 76 and 78 are connected in parallel and are in a circuit including the motor 66 and the A. C. source 67. The contacts 77 are in a circuit including a battery 79 and the shutter mechanism 81 of the camera 44. Mounted adjacent to the commutator 72 is a solenoid 82 which is connected by a circuit 83 to the control mechanism 43. The solenoid 82 is provided with a core 84 to which is secured a collar 85 between which and the solenoid 82 is mounted a coil spring 86. When the core 84 is extended it engages or is in the path of a pin 87 mounted on the commutator 72.

The mirror system 47 comprises two plane mirrors 91 and 92 which are pivotally connected to two sets of arms 93—94 and 95—96, the other ends of which are pivoted to two brackets 97 and 98 mounted on the back of the panel 56. Suitable slots such as 101 and 102 are provided in the panel 56 to allow the mirrors and arms to move into the positions shown in dotted lines at 103 and 104. Secured to one end of the arms 93 and 95 are two short arms 105 and 106 the ends of which are connected by two links 107 and 108 to the core 109 of a solenoid 111. To the core 109 is attached one end of a tension spring 112 the other end of which is secured to the panel 56. The winding of the solenoid 111 is connected through a battery 113 to a pair of contacts 114 which engage the commutator 72.

*Operation*

The news sheet 35 is placed in position in front of the television camera 24 and control generator 23, and transmitter 11 are turned on. At the receiver, shown in Fig. 2, the time clock 48, which may have been set at 5 a. m. the night before, operates at that time to close the circuit through channel 53, which turns on the receiver 40 and control mechanism 43. After waiting a few minutes the operator at the control console 12 turns the indicator 31 to the "News" position, as shown in Fig. 1. This closes a circuit from the A. C. source 29 to the synchronous motor 26 which starts rotating the commutator 27 in the direction of the arrow. As the commutator 27 rotates the segment 28 will engage the contacts 32 thus causing the control generator 23 to send out a distinctive signal on the audio channels 37 and 16 to the transmitter 11 which sends it as a radio signal for a brief interval of time.

This distinctive audio signal is picked up at the receiver 40, Fig. 2, and passes to the control mechanism 43, the circuits of which are responsive to this particular type of signal. After a predetermined time interval, depending upon the characteristics of the audio circuits, a control signal will be sent out over the circuit 83 which will energize the solenoid 82 causing the core 84 to be retracted, which will free the pin 87. The two commutators 72 and 73 then start rotating in the directions of the arrows under the action of the synchronous motor 71.

As the commutator 72 rotates the segment 74 will engage the contacts 114 thus closing a circuit through the solenoid 111. This will cause the core 109 to be moved to the left, which by means of the links 107 and 108 and the arms 93–96 will cause the mirrors 91 and 92 to be moved into the positions shown in dotted lines at 103 and 104. In this position the light from the screen of the kinescope 42 is reflected onto the shutter of the camera 44.

After this operation has taken place the segment 28, Fig. 1, will engage the contacts 33 which causes the video output circuit 36 to operate. This will cause a telecast of the news sheet to be transmitted by the transmitter 11. This telecast will be received by the receiver 40 and will be reproduced on the screen of the kinescope 42 in the usual manner. At this instant the commutator 73 will have rotated so that the segment 75 will engage the contacts 77 which will operate the shutter mechanism 81 of the camera 44, to take a picture of the news sheet on the film 57.

As the commutator 72 continues to rotate the segment 74 will disengage the contacts 114 thus deenergizing the solenoid 111. This will allow the core 109, links 107 and 108, arms 93–96 and mirrors 91 and 92 to return to their initial positions under the action of the spring 112. As the commutator 73 rotates the segment 75 will engage the contacts 78 closing a circuit through the synchronous motor 66, which by means of the worm 65 and gear 64 will rotate the roller 63 in the direction of the arrow. This will cause the exposed portion of the film 57 to be drawn into the processing chamber 61 where it will remain, as by this time the segment 75 will have moved out of engagement with the contacts 78 thus stopping the motor 66.

The film 57 remains in the processing chamber 61 a predetermined time depending on the nature of the process. At the end of this time interval the segment 75 will engage the contacts 76 thus starting the motor 66 which again will rotate the roller 63 in the direction of the arrow to move the exposed and printed film 57 from the processing chamber 61, through the V-shaped slot 68 and into the position indicated at 116 from which it may be torn off and used as a news sheet whenever desired. The commutators 72 and 73 continue to rotate until the pin 87 engages the core 84 of the solenoid 82 which became deenergized at the cessation of the control signal.

After a sufficient interval of time has elapsed to complete these operations the time clock 48 will break the circuit 53 thus turning off the receiver 40 and control mechanism 43. The system will then be in the inoperative condition and will be ready to receive a second telecast of news at some future time as determined by the setting of the time clock 48.

If it is desired to use the system for straight television the indicator 31 of the control console 12 is turned to either studio 1 or 2, the receiver 40 is turned on and a regular television program is transmitted and reproduced on the screen of the kinescope 42 in the usual manner.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. A system for utilizing television type transmission for the facsimile transmission of a still picture during a time pause in the transmission of a television program, comprising a television transmitter including a television camera adapted to scan an image for transmission to a remote point, a television receiver including a kinescope having a screen on which the image is reproduced, a photographic camera containing a sensitized film normally disposed out of the path of the rays from said screen, a normally inoperative optical system, means at said transmitter to produce a predetermined control signal, means at the receiver responsive to said control signal to shift said optical system into a position to direct the rays from said screen onto said photographic camera, shutter control means for said photographic camera, timed means responsive to said control signal to actuate said shutter control means for photographing the image on said screen onto said sensitized film, processing means for said film and timed means for advancing the exposed film from said camera through said processing means.

2. A system, as set forth in claim 1, in which said optical system comprises mirrors mounted for movement between inoperative and operative positions and shiftable in response to said control signal.

3. A system, as set forth in claim 1, including timed means synchronized by the transmitter control signal for actuating the shutter control means while the desired image is being received on the kinescope screen, and while the optical system is making the image on the kinescope screen available for the photographic camera.

4. A system, as set forth in claim 1, in which said processing means includes a chamber and said timed means is adapted to advance the exposed film to said chamber and, after a predetermined time, to feed the processed film from said chamber.

5. A system, as set forth in claim 1, having means to cause said receiver to complete a cycle for the facsimile reproduction of said image in response to each transmission of said control signal.

JOHN HAYS HAMMOND, Jr.

References Cited in the file of this patent

UNITED STATES PATENTS

| Number | Name | Date |
|---|---|---|
| 2,174,490 | Somers | Sept. 26, 1939 |
| 2,420,029 | Brady | May 6, 1947 |